(12) United States Patent
Suhir

(10) Patent No.: US 6,389,209 B1
(45) Date of Patent: May 14, 2002

(54) STRAIN FREE PLANAR OPTICAL WAVEGUIDES

(75) Inventor: Ephraim Suhir, Randolph, NJ (US)

(73) Assignee: Agere Systems Optoelectronics Guardian Corp., Miami Lakes, FL (US)

(*) Notice: Subject to any disclaimer, the term of this patent is extended or adjusted under 35 U.S.C. 154(b) by 0 days.

(21) Appl. No.: 09/390,191

(22) Filed: Sep. 7, 1999

(51) Int. Cl.[7] ................................................. G02B 1/10
(52) U.S. Cl. ........................................................ 385/129
(58) Field of Search ................................. 385/129, 130, 385/131, 132

(56) References Cited

U.S. PATENT DOCUMENTS

| | | | |
|---|---|---|---|
| 4,449,783 A | * 5/1984 | Witte | 385/46 |
| 4,889,401 A | * 12/1989 | Klement et al. | 385/131 |
| 4,904,037 A | * 2/1990 | Imoto et al. | 385/14 |
| 5,311,279 A | * 5/1994 | Wendler | 356/345 |
| 5,373,579 A | * 12/1994 | Eda | 385/131 |
| 5,483,613 A | 1/1996 | Bruce et al. | 385/129 |
| 5,627,407 A | 5/1997 | Suhir et al. | 275/701 |
| 5,703,350 A | 12/1997 | Suhir | 235/492 |
| 5,827,342 A | 10/1998 | Beguin et al. | 65/60.5 |
| 5,930,439 A | 7/1999 | Ojha et al. | 385/129 |

OTHER PUBLICATIONS

Luryi et al., "New Approach To The High Quality Epitaxial Growth of Lattice–Mismatched Materials," Jul. 21, 1986, Applied Physics Letters vol. 49, No. 3, pp. 140–142.
E. Suhir, "Stresses In Bi–Metal Thermostats," Sep. 1986, Journal of Applied Mechanics, vol. 108, pp. 657–660.
E. Suhir, "An Approximate Analysis of Stresses In Multi-layer Elastic Thin Films," Mar. 1988, Journal of Applied Mechanics, vol. 55, pp. 144–148.
Nadler et al., "Polarisation Insensitive Wavelength Multi-plexers Using Stress Release Grooves," ECOC'98, Sep. 1998, Madrid Spain, pp. 129–130.

* cited by examiner

Primary Examiner—Georgia Epps
Assistant Examiner—John J. Magee
(74) Attorney, Agent, or Firm—J. Delarosa

(57) ABSTRACT

The present invention is directed to a planar optical waveguide comprising a waveguide core layer interposed between upper and lower cladding layers, characterized in that a so-called "effective" coefficient of thermal expansion of the layer containing the waveguide core is approximately the same as that of the substrate supporting the optical waveguide.

20 Claims, 3 Drawing Sheets

STRAIN FREE PLANAR OPTICAL WAVEGUIDES

TECHNICAL FIELD

The present invention relates to planar optical waveguides and, more particularly, to planar optical waveguides that employ optical layers engineered to minimize or eliminate strain-induced birefringence in such planar optical waveguides.

BACKGROUND OF THE INVENTION

Presently, optical devices that perform useful and necessary functions in optical communication systems are typically built within a block of transparent material, such as silica, silicon or lithium niobate, among others, using so-called "planar optical waveguides." Planar optical waveguides guide light along defined paths through the optical device using a region of material of higher refractive index (the core) than the surrounding material (the cladding). Such planar optical waveguides are conventionally formed by depositing a base layer of silicon dioxide (lower cladding layer) on a silicon substrate, followed by the deposition of a doped silica layer to form the waveguide core which confines the light in the same way a fiber does. Using standard lithographic techniques, the doped silica core layer is patterned to form a rectangular cross-sectional core. Following this latter patterning, an additional layer of silica is deposited to act as a top cladding layer.

During fabrication, however, any introduced strain due to the different thermal expansion between silicon and silica induces birefringence in the waveguide core. Unfortunately, this stress-induced birefringence causes the two orthogonal polarization modes of the light in the waveguide core to travel at slightly different propagation speeds, adversely affecting the transmission of the light and the performance of the optical device.

As such, various solutions have been proposed for reducing, or eliminating the stress-induced birefringence in planar optical waveguides. In one approach, deep grooves are judiciously etched adjacent to the waveguide to release the strain. See, for example, "Polarisation Insensitive Wavelength Multiplexers Using Stress Release Grooves," Nadler et al., ECOC'98, pp. 20–24, September 1998, Madrid, Spain. This technique, however, is believed to significantly increase manufacturing costs.

In another approach, doped silica substrates rather than silicon substrates, functioning as the lower cladding layer, are employed to support the doped silica waveguide structures. To reduce or eliminate the strain-induced birefringence, the doped silica substrate is made to have a coefficient of thermal expansion approximating the temperature coefficient of the doped silica substrate. See, for example, U.S. Pat. No. 5,483,613, which is commonly assigned and incorporated herein by reference. As stated therein, the reasoning behind this latter technique is that "the doped silica substrate and the waveguide element layer contract the same amount as they cool, resulting in substantial elimination of thermally-induced strain caused by different degrees of contraction." Col.3:3–6. In another approach, U.S. Pat. No. 5,930,439 discloses discovering empirically that by making the coefficient of thermal expansion of the upper cladding layer close to that of the substrate, it was possible to achieve low polarization sensitivity in conventional waveguide structures.

Unfortunately, it has not been recognized that the above latter techniques are based on an analysis that does not accurately account for factors affecting the strain in the waveguide core, and hence misleading when used for the purpose of eliminating the strain-induced birefringence discussed herein above.

SUMMARY OF THE INVENTION

In accordance with the teachings of the present invention, it has been discovered that a stress analysis made on the basis of strain compatibility conditions that includes the composite nature of the waveguide core layer of planar optical waveguides provides a structure and technique for fabricating planar optical waveguides which more properly evaluate the strain in the waveguide core for the purpose of optimally reducing strain-induced birefringence. Preferably, the planar optical waveguides are uniquely characterized in that the "effective" coefficient of thermal expansion of the waveguide core layer is approximately the same as that of the substrate.

BRIEF DESCRIPTION OF THE DRAWINGS

The features and advantages of the present invention will become more readily apparent from the following detailed description of the invention in which like elements are labeled similarly and in which.

DETAILED DESCRIPTION

The present invention is directed to a planar optical waveguide comprising a waveguide core layer interposed between upper and lower cladding layers, characterized in that a so-called "effective" coefficient of thermal expansion of the layer containing the waveguide core is approximately the same as that of the substrate supporting the optical waveguide. Unlike prior art techniques, the present invention uses an analysis found on the basis of strain compatibility conditions which importantly addresses the composite nature of the layer containing the waveguide core, herein after referred to as the "waveguide core layer."

Without any loss of generality or applicability for the principles of the invention, the present invention is described with respect to a planar optical waveguide employing a conventional structure having a silicon substrate. It should be clearly understood that the present invention is equally applicable to other types of waveguide structures, which alternatively employ substrates of different material, such as doped silica, lithium niobate, and the like.

Figure 1:
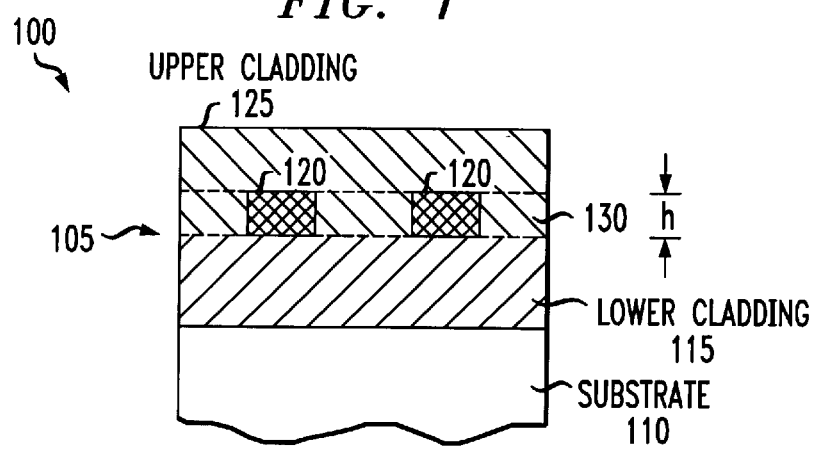
FIG. 1 is a schematic cross-sectional view of an optical device according to the principles of the present invention.

Referring to FIG. 1, there is shown a schematic view of an optical device 100 having a planar optical waveguide 105 comprising a substrate 110 on which a lower cladding layer 115 is formed on one side. Substrate 110 is of sufficient thickness to provide mechanical stability for optical device 100. In conventional planar waveguide structures, substrate 110 is a silicon wafer, with a $SiO_2$ layer of about 10–20 $\mu$m as lower cladding layer 115. Lower cladding layer 115 may be thermally grown or deposited by mixing reactive gases at high temperature that produce $SiO_2$ which deposit on the surface of substrate 110.

A second layer of silica deposited on lower cladding layer 115 is masked and etched to form one or more waveguide core(s) 120, which is usually several microns thick. So as to confine light within the waveguide core, the refractive index of core layer 120 is made higher than that of lower cladding layer 115 by doping the core with, for example, germania, phosphorous oxide, boron oxide, fluorine, titanium, or combinations thereof. Typically, the difference in refractive indices is about $10^{-2}$. Another layer of silica having the same refractive index as the lower cladding is provided over waveguide core(s) 120, forming a continuous structure with lower cladding layer 115 so as to cover completely the three sides of waveguide core(s) 120. Part of this latter deposited silica layer becomes upper cladding layer 125, with the remaining material contained in what is herein referred to as "waveguide core layer" 130 which is shown in phantom and includes waveguide core(s) 120.

In accordance with the teachings of the present invention, it has been discovered that a stress analysis made on the basis of strain compatibility conditions that includes the composite nature of waveguide core layer 130 provides a technique and structure for fabricating planar optical waveguides which more properly evaluate the strain in the waveguide core for the purpose of optimally reducing the strain-induced birefringence. Preferably, the planar optical waveguides are uniquely characterized in that the "effective" coefficient of thermal expansion of waveguide core layer 130 is approximately the same as that of substrate 110, as discussed in more detail herein below.

Figure 2:
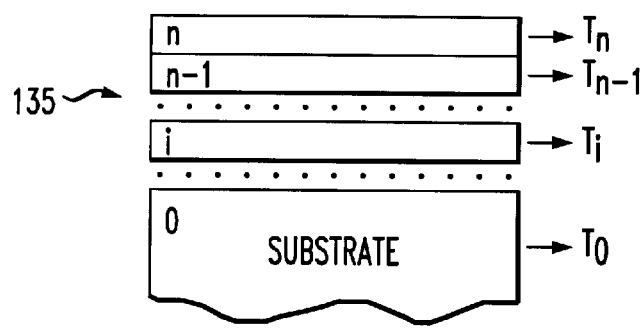
FIG. 2 is a schematic cross-sectional view of a multilayer thin film heterostructure useful in developing a stress analysis model for a planar optical waveguide.

To better understand the principles of the present invention, it will be beneficial to first examine the stresses in a multilayered heterostructure consisting of thin film layers fabricated on a substrate, similar to planar optical waveguide 105. Referring to FIG. 2, if multilayered heterostructure 135 is uniformly heated by the $\Delta t$ temperature, and then subsequently cooled, the expression for the strains $\sigma_i$ of the layers can be written as follows, (i=0, 1, . . . , n with i=0 referring to the substrate, and n referring to the number of layers):

$$\sigma_i = \alpha_i \Delta t + \frac{1}{K_i} T_i \quad (1)$$

where $\alpha_i$ are the coefficients of thermal expansion, $T_i$ are the temperature-induced shear forces in the layers, and the functions $K_i$ which characterize the stiffness of the layers are given by $$K_i = E_i^* h_i \quad (2)$$

where $h_i$ are the thickness of the layers, and $$E_i^* = \frac{E_i}{1 - v_i}$$

are the generalized Young's Moduli of the layers. $E_i$ are the Young's Moduli, and $v_i$ the Poisson ratios of the layers. The first terms in Eq. (1) are the unrestricted thermal expansions of the layers, whereas the second terms are due to the shearing forces $T_i$ and calculated under the assumptions that these forces are uniformly distributed over the layer thickness and that there is no displacement in the direction of the layer width.

Using the condition $\sigma_i = \sigma_0$ of the strain compatibility, we have:

$$T_i = K_i \left[ \frac{T_0}{K_0} - (\alpha_0 - \alpha_i) \Delta t \right] \quad (3)$$

This latter equation follows from the fact that the strain in the substrate must be equal to the strain in the layers of the heterostructure.

Under the equilibrium condition that $$\sum_{i=0}^{n} T_i = 0$$

and introducing Eq. (2) into the equilibrium condition, we obtain the following:

$$T_i = K_i \left( \alpha_i - \frac{\sum_{i=0}^{n} \alpha_i K_i}{\sum_{i=0}^{n} K_i} \right) \Delta t \quad (4)$$

For thin film layers fabricated on thick substrates, Eq. (4) yields:

$$T_i = K_i (\alpha_i - \alpha_0) = E_i^0 h^i (\alpha_i - \alpha_0) \quad (5)$$

$$\sigma_i = \frac{T_i}{h_i} = E_i^0 (\alpha_i - \alpha_0)$$

under the approximation that $$\sum_{i=0}^{n} \alpha_i K_i \approx \alpha_0 K_0 \quad \text{and} \quad \sum_{i=0}^{n} K_i \approx K_0 \quad \text{for} \quad (K_0 \gg K_i).$$

Based on the above developed strain compatibility analysis, the expression for the temperature induced force $T_w$ in waveguide core layer 130 can be found in the form of Eq. (5). However, the elastic and thermal properties of waveguide core layer 130 are influenced by the structural characteristics of both waveguide core 120 and portions of upper cladding 125 residing in waveguide core layer 130 due to its composite nature. As a result, the "effective" Young's Modulus as well as the "effective" coefficient of thermal expansion of waveguide core layer 130 each differs from that of either the waveguide core or the upper cladding material. These "effective" or weighted factors represent the composite or hybrid nature of waveguide core layer 130 and enable one to properly account for the factors affecting the strain in waveguide core layer 130.

Figure 3:
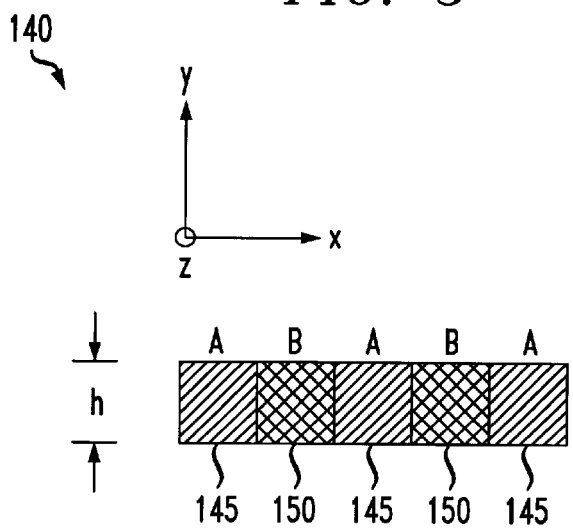
FIG. 3 is a schematic cross-sectional view of a composite thin-film layer useful in deriving the effective Young's Modulus and effective coefficient of thermal expansion.

The "effective" Young's Modulus and the "effective" coefficient of thermal expansion, however, can be evaluated based on the following analysis. Referring to FIG. 3, let a single layer structure 140 of thickness h consists of dissimilar region materials 145 (A) and 150 (B), with generalized Young's Moduli $E_A^*$, $E_B^*$ and coefficients of thermal expansion $\alpha_A$, $\alpha_B$, respectively, where $$E_A^* = \frac{E_A}{1 - v_A} \quad \text{and} \quad E_B^* = \frac{E_B}{1 - v_B}.$$

Similarly, $E_A$, $E_B$ are the Young's Moduli, and $v_A$, $v_B$ are the Poisson ratios of materials A and B, respectively. A tensile force, T, applied along the axial or longitudinal direction (z-axis) yields a total strain, $\epsilon$, as follows:

$$\epsilon = \frac{T}{E_A^* A_A} + \frac{T}{E_B^* A_B} \qquad (6)$$

$$= \frac{T}{h}\left(\frac{1}{E_A^* w_A} + \frac{1}{E_B^* w_B}\right)$$

where $A_A$ and $A_B$ are summed cross sectional areas, and $w_A$ and $w_B$ are the total summed widths of materials A and B, respectively. If single layer structure 140 had, however, been homogeneous and similarly divided into corresponding sections, then the strain $\epsilon$ would have been expressed as:

$$\epsilon = \frac{T}{E_{AB}^* A} = \frac{T}{E_{AB}^* h(w_A + w_B)} \qquad (7)$$

where A is the total cross sectional area of the layer, and $E_{AB}^*$ is the so-called "effective" Young's Modulus. Comparing Eq. (7) with Eq. (6), we find that the "effective" Young's Modulus $E_{AB}^*$ of composite single layer structure 140 can be expressed as:

$$E_{AB}^* = \frac{E_A^* w_A + E_B^* w_B}{(w_A + w_B)} \qquad (8)$$

$$= E_A^* \frac{1 + \chi_e \chi_l}{\chi_e(1 + \chi_l)}$$

where $\chi_e$ is the ratio $$\frac{E_A^*}{E_B^*},$$

and $\chi_l$ is the ratio $$\frac{w_A}{w_B}.$$

Similarly, the "effective" coefficient of thermal expansion for composite single layer structure 140 can be found. If single layer structure 140 is uniformly heated by the temperature $\Delta t$, the compatibility conditions of the thermally induced strains and forces require the following relationships:

$$-\alpha_A \Delta t + \lambda_A T_A = -\alpha_B \Delta T + \lambda_B t_B$$

$$T_A + T_B = 0 \qquad (9)$$

where $\alpha_A$ and $\alpha_B$ are the coefficients of thermal expansion, $\lambda_A$ and $\lambda_B$ are the axial compliances given by $1/K_A$ and $1/K_B$, and $T_A$ and $T_B$ are the thermally induced forces of materials A and B, respectively. Equation (9) can be rewritten as follows:

$$\lambda_A T_A - \lambda_B T_B = \Delta \alpha \Delta t, \ \Delta \alpha = \alpha_A - \alpha_B$$

$$T_A + T_B = 0 \qquad (10)$$

From equation (10), we obtain the following formulas for the forces $T_A$ and $T_B$ acting on the layer, and the total axial compliance $\lambda$:

$$T_A = -T_B = \frac{\Delta \lambda \Delta t}{\lambda}, \lambda = \lambda_A + \lambda_B = \frac{E_A^* w_A + E_B^* w_B}{E_A^* E_B^* w_A w_B h} \qquad (11)$$

The thermally induced strain e can therefore be expressed as follows:

$$\epsilon = -\alpha_A \Delta t + \lambda_A T_A \qquad (12)$$

$$= -\frac{\alpha_A \lambda_B + \alpha_B \lambda_A}{\lambda_A + \lambda_B} \Delta t$$

Again, had single layer structure 140 been homogeneous, the strain $\epsilon$ could have been expressed as:

$$\epsilon = -\alpha_{AB}^* \Delta t \qquad (13)$$

where $\alpha_{AB}^*$ is the "effective" coefficient of thermal expansion of the layer. Comparing Eq. (13) with Eq. (12), we find that the "effective" coefficient of thermal expansion $\alpha_{AB}^*$ of composite single layer structure 140 can be expressed as:

$$\alpha_{AB}^* = \frac{\alpha_A \chi_e \chi_l + \alpha_B}{1 + \chi_e \chi_l} \qquad (14)$$

Inasmuch as the "effective" Young's Modulus and the "effective" coefficient of thermal expansion represent the composite nature of the waveguide core layer, the temperature-change induced force $T_w$ in waveguide core layer 120 can now be found on the basis of Eqs. (3), (5) (8) and (14) as follows, with waveguide core 120 being material A and upper cladding 125 being material B:

$$E_w^* = E_{core}^*\left(\frac{1 + \chi_{wl} \chi_{we}}{\chi_{we}(1 + \chi_{wl})}\right) \qquad (15)$$

$$\alpha_w^* = \frac{\alpha_{core} \chi_{we} \chi_{wl} + \alpha_{uc}}{1 + \chi_{we} \chi_{wl}}$$

where $\chi_{we}$ is the ratio $$\frac{E_{core}^*}{E_{uc}^*}$$

of the generalized Young's Modulus of the material of the waveguide core, $E_{core}^*$, to the generalized Young's Modulus of the material of the upper cladding, $E_{uc}^*$; $\chi_{wl}$ is the ratio $$\frac{w_{core}}{w_{uc}}$$

of the summed widths of the waveguide cores, $w_{core}$, to the summed widths of the upper cladding in the waveguide core layer, $w_{uc}$; $h_w$ is the thickness of the waveguide core layer, and $\alpha_0$ is the coefficient of thermal expansion of the substrate.

In accordance with the principles of the invention, the underlying rational to achieve a strain free waveguide core(s) 120 is that if there is zero compression or tension in waveguide core layer 130, then no appreciable strain could be expected in the waveguide core(s). Under this assumption that $T_w = 0$, Eq. (15) importantly yields that the "effective" coefficient of thermal expansion, $\alpha_w^*$, of waveguide core layer 125 should be the same as that of substrate 110, i.e., $\alpha_w^* = \alpha_0$ and inserting Eq. (15) can be rewritten as:

$$\alpha_w^* = \frac{\alpha_{core}\chi_{we}\chi_{wl} + \alpha_{uc}}{1 + \chi_{we}\chi_{wl}} = \alpha_0 \quad (16)$$

In a preferred embodiment, the "effective" coefficient of thermal expansion of waveguide core layer 130 can be readily made the same as that of substrate 110 by judiciously doping upper cladding layer 125 with appropriate amounts of, for example, germania, phosphorous oxide, boron oxide, fluorine, titanium, or combinations thereof, to have an optimum coefficient of thermal expansion $\alpha'_{uc}$ in accordance with the following equation derived from Eq. (16):

$$\alpha'_{uc} = \alpha_0 + \chi_{we}\chi_{wl}(\alpha_0 - \alpha_{core}) \quad (17)$$

Alternatively, the ratios $\chi_{we}$, $\chi_{wl}$ or the coefficient of thermal expansion $\alpha_{core}$ of the waveguide core can be tailored or engineered such that the "effective" coefficient of thermal expansion of waveguide core layer 130 likewise matches that of substrate 110.

Table I below shows the relationship between this "optimum" coefficient of thermal expansion $\alpha'_{uc}$ of upper cladding 125 for different ratios $\chi_{wl}$, where an 11 μm thick SiO$_2$ upper cladding (v$_3$=0.2, E$_{uc}^*$=10.5×10$^{-6}$ psi), a 4 μm thick waveguide core layer (v$_{core}$=0.2, E$_{core}^*$=10.5×10$^{-6}$ psi, $\alpha_{core}$=1.5×10$^{-6}$ 1/° C.), and a 15 μm thick SiO$_2$ lower cladding (v$_{lc}$=0.2, E$_{lc}^*$=10.5×10$^{-6}$ psi, $\alpha_{lc}$=0.5×10$^{-6}$ 1/° C.) are applied on a 0.625 mm thick Si substrate (v$_0$=0.2, E$_3^*$=17.5×10$^{-6}$ psi, $\alpha_0$=3.2×10$^{-6}$ 1/° C.), and $\chi_{w3}$=1.

TABLE I

| X$_{w1}$ | 0 | 0.2 | 0.4 | 0.6 | 0.8 |
|---|---|---|---|---|---|
| Optimum $\alpha'_{uc}$ × 10$^{-6}$ 1/° C. | 3.2 | 3.54 | 3.88 | 4.22 | 4.56 |

Figure 4:
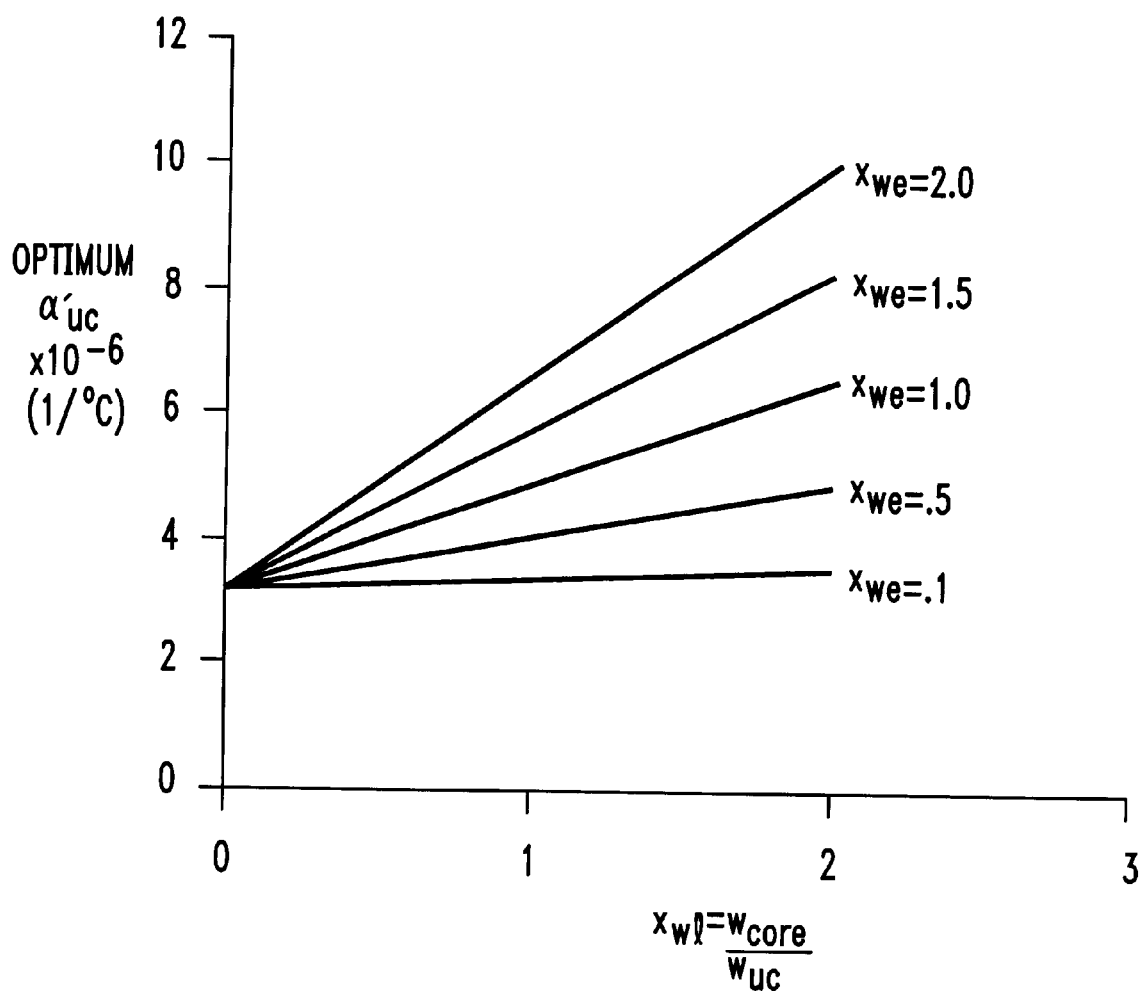
FIG. 4 is a graph of the dependence of the optimum coefficient of thermal expansion as a function of the ratios $\chi_{we}$ and $\chi_l$.

A more detailed showing of the dependence of the optimum coefficient of thermal expansion $\alpha'_{uc}$ for the above parameters is shown in FIG. 4. It is noteworthy that the optimum coefficient of thermal expansion $\alpha'_{uc}$ of upper cladding layer 125 for a strain free waveguide core is dependent on the ratio $\chi_{wl}$, which characterizes the geometric relationship of waveguide core 120 within waveguide core layer 130. When waveguide core(s) 120 increasingly occupies a smaller fraction of waveguide core layer 130, the optimum coefficient of thermal expansion $\alpha'_{uc}$ of upper cladding layer 125 deviates decreasingly from and approaches the coefficient of thermal expansion $\alpha_0$ of substrate 110, as expected. Interestingly, it should also be observed that if the Young's Modulus E$_{core}^*$ of the waveguide core is increasingly greater than the Young's Modulus E$_{uc}^*$ of the upper cladding, the optimum coefficient of thermal expansion $\alpha'_{uc}$ of the upper cladding layer increasingly deviates from the coefficient of thermal expansion of the substrate $\alpha_0$, and vice a versa.

In addition, doping substrate 110 such that it has the same thermal coefficient of expansion as the waveguide core ($\alpha_0 = \alpha_{core}$) requires that the optimum thermal coefficient of the upper cladding layer $\alpha'_{uc}$ match that of substrate 110. In doing so, it should be noted from Eq. (17) that changes now in either the ratio $\chi_{we}$ or $\chi_{wl}$ do not affect the value of the optimum coefficient of thermal expansion of upper cladding 125, and hence the strain in waveguide core(s) 120.

Consider the case, however, where the condition of zero compression or tension cannot be met, i.e., $\alpha_w^* \neq \alpha_0$. Then, the strain within waveguide core layer 130 can be minimized by judiciously reducing the "effective" Young's Modulus E$_w^*$ of waveguide core layer 130. Although not reducing the strain, low height-to-width ratios of waveguide core(s) 120 are preferable since they reduce the thickness of the entire waveguide core layer, leading to a more uniform strain distribution.

Figure 5:
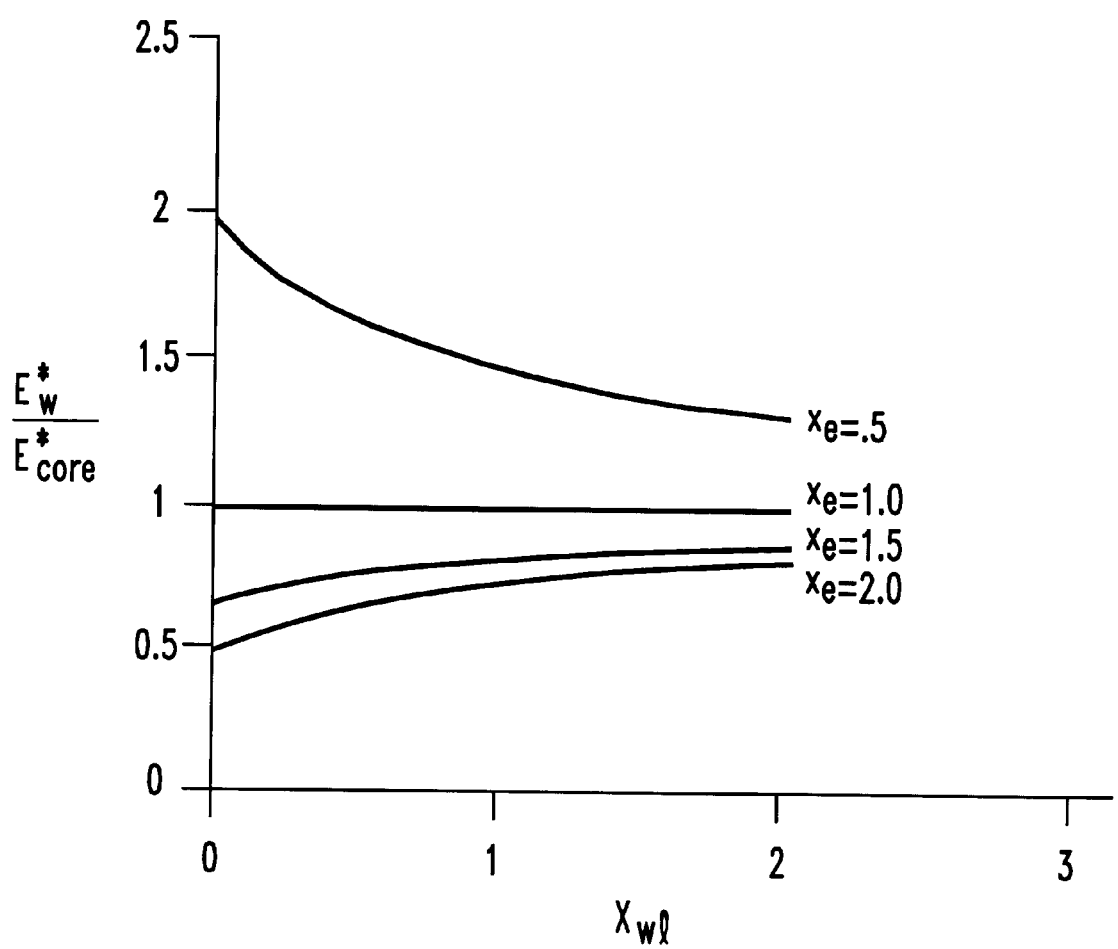
FIG. 5 is a graph of the dependence of the normalized "effective" Young's Modulus as a function of the ratios $\chi_{we}$ and $\chi_l$.

Shown in FIG. 5 is the dependence of the effective's Young's Modulus E$_w^*$ normalized to that of the waveguide core. When the Young's Moduli of the waveguide core E$_{core}^*$ and the upper cladding E$_{uc}^*$ are the same ($\chi_{we}$=1), changes in the ratio $\chi_{wl}$ do not affect the "effective" Young's Modulus of the waveguide core layer, and hence the strain. If, however, the Young's Modulus of the substrate is greater than that of the upper cladding ($\chi_{we}$>1), which is typically the case, then although the difference between the moduli may be small, increasing the ratio $\chi_{we}$ and/or decreasing the ratio $\chi_{wl}$ likewise lowers the "effective" Young's Modulus, and hence the strain in the waveguide core.

The above developed stress analysis made on the basis of strain compatibility conditions that includes the composite nature of the waveguide core layer, thus establishes the optimum thermal and elastic properties of the waveguide layers given the structural dimensions of the layers for the chosen materials so as to reduce the strain-induced birefringence. More specifically, the planar optical waveguides are uniquely characterized in that the "effective" coefficient of thermal expansion of the waveguide core layer is approximately the same as that of the substrate, which may be effected in various manners, but preferably by judiciously selecting the coefficient of thermal expansion of the upper cladding. The planar optical waveguides of the present invention may be employed in numerous optical devices, including optical filters, multiplexers, demultiplexers, beam splitters, optical taps, among others It should be understood that the embodiments herein are merely illustrative of the principles of the invention. Various modifications may be made by those skilled in the art which will embody the principles of the invention and fall within the spirit and the scope thereof.

What is claimed is:

1. A planar optical waveguide comprising upper and lower cladding layers on a substrate having at least one waveguide core formed between said upper and lower cladding layers with said waveguide core and a portion of said upper cladding layer constituting a waveguide core layer, wherein the improvement comprises said waveguide core layer having an effective coefficient of thermal expansion substantially close or equal to the coefficient of thermal expansion of said substrate.

2. The planar optical waveguide of claim 1 wherein the effective coefficient of thermal expansion $\alpha_w^*$ of said waveguide core layer is given by, $$\alpha_w^* = \frac{\alpha_{core}\chi_{we}\chi_{wl} + \alpha_{uc}}{1 + \chi_{we}\chi_{wl}}$$

where $\chi_{we}$ is the ratio $$\frac{E_{core}^*}{E_{uc}^*}$$

of the generalized Young's Modulus of the material of the waveguide core, E$_{core}^*$ to the generalized Young's Modulus of the material of the upper cladding, E$_{uc}^*$; $\chi_{wl}$ is the ration $$\frac{w_{core}}{w_{uc}}$$

of the summed widths of the waveguide cores, $w_{core}$, to the summed widths of the upper cladding in the waveguide core layer, $w_{uc}$; $\alpha_{core}$ is the coefficient of thermal expansion of the waveguide core; and $\alpha_{uc}$ is the coefficient of thermal expansion of the upper cladding layer.

3. The planar optical waveguide of claim 2 wherein said upper cladding layer has an optimum coefficient of thermal expansion $\alpha'_{uc}$ such that said waveguide core has no appreciable strain, said optimum coefficient of thermal expansion given by:

$$\alpha'_{uc} = \alpha_0 + \chi_{we}\chi_{wl}(\alpha_0 - \alpha_{core})$$

where $\alpha_0$ is the coefficient of thermal expansion of the substrate.

4. The planar optical waveguide of claim 3 wherein said upper cladding layer includes a dopant at a level having associated therewith said optimum coefficient of thermal expansion $\alpha'_{uc}$.

5. The planar optical waveguide of claim 4 wherein said dopant is selected from germania, phosphorous oxide, boron oxide, fluorine, and titanium.

6. The planar optical waveguide of claim 1 wherein said upper and lower cladding layers form a continuous structure so as to completely cover the sides of said at least one waveguide core.

7. The planar optical waveguide of claim 1 wherein said waveguide core has a refractive index higher than the refractive index of said upper and lower cladding layers.

8. The planar optical waveguide of claim 7 wherein the difference in refractive indices of said waveguide core and said upper and lower cladding layers is about $10^{-2}$.

9. The planar optical waveguide of claim 1 wherein said substrate is formed of silicon, and said waveguide core and upper and lower layers are formed of silicon oxide.

10. The planar optical waveguide of claim 1 wherein the thermally induced shear force $T_w$ in said waveguide core is given by the following for differences in the effective coefficient of thermal expansion $\alpha_w^*$ of said waveguide core layer and the coefficient of thermal expansion $\alpha_0$ of the substrate:

$$T_w = E_w^* h_w (\alpha_w^* - \alpha_0)$$

$$E_w^* = E_{core}^* \left( \frac{1 + \chi_{wl}\chi_{xe}}{\chi_{we}(1 + \chi_{wl})} \right)$$

$$\alpha_w^* = \frac{\alpha_{core}\chi_{we}\chi_{wl} + \alpha_{uc}}{1 + \chi_{we}\chi_{wl}}$$

where $\chi_{we}$ is the ratio $$\frac{E_{core}^*}{E_{uc}^*}$$

of the generalized Young's Modulus of the material of the waveguide core, $E_{core}^*$, to the generalized Young's Modulus of the material of the upper cladding, $E_{uc}^*$; $\chi_{wl}$ is the ratio $$\frac{w_{core}}{w_{uc}}$$

of the summed widths of the waveguide cores, $w_{core}$, to the summed widths of the upper cladding in the waveguide core layer, $w_{uc}$; $\alpha_{core}$ is the coefficient of thermal expansion of the waveguide core; and $\alpha_{uc}$ is the coefficient of thermal expansion of said upper cladding layer.

11. A process for fabricating a planar optical waveguide comprising the steps of forming upper and lower cladding layers on a substrate, forming at least one waveguide core between sail upper and lower cladding layers with said waveguide core and a portion of said upper cladding layer constituting a waveguide core layer, and adjusting the effective coefficient of thermal expansion of said waveguide core layer to be substantially close or equal to the coefficient of thermal expansion of said substrate.

12. The process of claim 11 wherein the effective coefficient of thermal expansion $\alpha_w^*$ of said waveguide core layer is given by, $$\alpha_w^* = \frac{\alpha_{core}\chi_{we}\chi_{wl} + \alpha_{uc}}{1 + \chi_{we}\chi_{wl}}$$

where $\chi_{we}$ is the ratio $$\frac{E_{core}^*}{E_{uc}^*}$$

of the generalized Young's Modulus of the material of the waveguide core, $E_{core}^*$, to the generalized Young's Modulus of the material of the upper cladding, $E_{uc}^*$; $\chi_{wl}$ is the ratio $$\frac{w_{core}}{w_{uc}}$$

of the summed widths of the waveguide cores, $w_{core}$, to the summed widths of the upper cladding in the waveguide core layer, $w_{uc}$; $\alpha_{core}$ is the coefficient of thermal expansion of the waveguide core; and $\alpha_{uc}$ is the coefficient of thermal expansion of the upper cladding layer.

13. The process of claim 12 further comprising the step of adjusting the coefficient of thermal expansion of said upper cladding layer to have an optimum coefficient of thermal expansion $\alpha'_{uc}$ given by the following whereby said waveguide core has no appreciable strain:

$$\alpha'_{uc} = \alpha_0 + \chi_{we}\chi_{wl}(\alpha_0 - \alpha_{core})$$

where $\alpha_0$ is the coefficient of thermal expansion of thee substrate.

14. The process of claim 13 further including the step of doping said upper cladding layer with a dopant at a level to have associated therewith said optimum coefficient of thermal expansion $\alpha'_{uc}$.

15. The process of claim 14 wherein said dopant is selected from germania, phosphorous oxide, boron oxide, fluorine, and titanium.

16. The process of claim 11 wherein said upper and lower cladding layers form a continuous structure so as to completely cover the sides of said at least one waveguide core.

17. The process of claim 11 wherein said waveguide core has a refractive index higher than the refractive index of said upper and lower cladding layers.

18. The process of claim 17 wherein the difference in refractive indices of said waveguide core and said upper and lower cladding layers is about $10^{-2}$.

19. The process of claim 11 wherein said substrate is formed of silicon, and said waveguide core and upper and lower layers are formed of silicon oxide.

20. The process of claim 11 wherein the thermally induced shear force $T_w$ in said waveguide core is given by the following for differences in the effective coefficient of thermal expansion $\alpha'_w$ of said waveguide core layer and the coefficient of thermal expansion $\alpha_0$ of the substrate:

$$T_w = E^*_w h_w (\alpha^*_w - \alpha_0)$$

$$E^*_w = E^*_{core}\left(\frac{1 + \chi_{wl}\chi_{xe}}{\chi_{we}(1 + \chi_{wl})}\right)$$

$$\alpha^*_w = \frac{\alpha_{core}\chi_{we}\chi_{wl} + \alpha_{uc}}{1 + \chi_{we}\chi_{wl}}$$

where $\chi_{we}$ is the ratio $$\frac{E^*_{core}}{E^*_{uc}}$$

of the generalized Young's Modulus of the material of the waveguide core, $E_{core}{}^*$, to the generalized Young's Modulus of the material of the upper cladding, $E'_{uc}$; $\chi_{wl}$ is the ratio $$\frac{w_{core}}{w_{uc}}$$

of the summed widths of the waveguide cores, $w_{core}$, to the summed widths of the upper cladding in the waveguide core layer, $w_{uc}$; $h_w$ is the thickness of the waveguide core layer; and $\alpha_{uc}$ is the coefficient of thermal expansion of said upper cladding layer.

* * * * *